United States Patent
Richter et al.

(10) Patent No.: US 12,123,650 B2
(45) Date of Patent: Oct. 22, 2024

(54) COOLER AND A METHOD FOR COOLING BULK MATERIAL

(71) Applicants: thyssenkrupp Industrial Solutions AG, Essen (DE); thyssenkrupp AG, Essen (DE)

(72) Inventors: Stefanie Richter, Oelde (DE); Ludwig Koenning, Ahlen (DE); Jochen Altfeld, Münster (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 0 days.

(21) Appl. No.: 17/768,803

(22) PCT Filed: Oct. 12, 2020

(86) PCT No.: PCT/EP2020/078560
§ 371 (c)(1),
(2) Date: Apr. 13, 2022

(87) PCT Pub. No.: WO2021/074055
PCT Pub. Date: Apr. 22, 2021

(65) Prior Publication Data
US 2024/0093941 A1 Mar. 21, 2024

(30) Foreign Application Priority Data
Oct. 14, 2019 (BE) .................................. 2019/5691
Oct. 14, 2019 (DE) ..................... 10 2019 215 731.9

(51) Int. Cl.
*F27D 15/02* (2006.01)
*C04B 7/47* (2006.01)
*C04B 7/48* (2006.01)

(52) U.S. Cl.
CPC ............ *F27D 15/0213* (2013.01); *C04B 7/47* (2013.01); *C04B 7/48* (2013.01); *F27D 2015/026* (2013.01)

(58) Field of Classification Search
CPC ... C04B 7/47; C04B 7/48; F27D 15/02; F27D 15/0213; F27D 15/026
(Continued)

(56) References Cited

U.S. PATENT DOCUMENTS 2,375,487 A * 5/1945 Newhouse .......... F27D 15/0213
432/78
3,831,291 A 8/1974 Kayatz
(Continued)

FOREIGN PATENT DOCUMENTS

DE         31 315 14 C1    9/1988
DE   20 2013 005 996 U1    7/2013
(Continued)

OTHER PUBLICATIONS

English Translation of International Search Report issued in PCT/EP2020/078560, dated Nov. 16, 2020.

*Primary Examiner* — Terrell H Matthews
(74) *Attorney, Agent, or Firm* — thyssenkrupp North America, LLC

(57) ABSTRACT

A method can be used to cool bulk material in a fine material cooler. The method may involve admitting bulk material to be cooled into the fine material cooler through a material inlet, conveying the coarse material with a first mechanical or pneumatic conveying unit, and conveying the fine material with a second conveying unit in a conveying direction through the fine material cooler to a material outlet. The bulk material may have a fine material proportion of 70% to 95% and a coarse material proportion of 5% to 30%. The fine
(Continued)

material may have a grain size of 10-5 mm to 4 mm, and the coarse material may have a grain size of 4 mm to 100 mm.

13 Claims, 4 Drawing Sheets

(58) Field of Classification Search
USPC .......................................................... 209/11
See application file for complete search history.

(56) References Cited

U.S. PATENT DOCUMENTS

| | | | |
|---|---|---|---|
| 3,892,044 | A | 7/1975 | Kayatz |
| 4,076,493 | A | 2/1978 | Gardner |
| 4,457,081 | A | 7/1984 | Von Wedel |
| 4,496,396 | A | 1/1985 | Steinbiss et al. |
| 5,353,517 | A | 10/1994 | Weiss |
| 5,759,026 | A | 6/1998 | Von Wedel |
| 2001/0034003 | A1 * | 10/2001 | Wellmann ................ F27B 7/33 432/118 |
| 2010/0044479 | A1 * | 2/2010 | Euculano ................ B02C 4/02 241/24.1 |
| 2019/0226038 | A1 | 7/2019 | Waning et al. |

FOREIGN PATENT DOCUMENTS

| | | | | |
|---|---|---|---|---|
| DE | 10 2016 207 720 | A1 | | 11/2017 |
| DE | 102019215735 | A1 * | | 4/2021 |
| EP | 0 576 053 | A1 | | 12/1993 |
| EP | 1 178 277 | A1 | | 2/2002 |
| EP | 2799801 | A1 * | 11/2014 | ............... B07B 4/08 |
| EP | 2803650 | A1 * | 11/2014 | ............... F27B 7/38 |
| TW | 418312 | B | | 1/2001 |
| TW | 418312 | U * | | 12/2011 |
| TW | 201812029 | A * | 4/2018 | ............... C21D 1/18 |
| WO | WO-2011035509 | A1 * | 3/2011 | ............... C04B 7/47 |
| WO | 2017/190865 | A1 | | 11/2017 |
| WO | WO-2021074057 | A1 * | | 4/2021 |

* cited by examiner

COOLER AND A METHOD FOR COOLING BULK MATERIAL

CROSS REFERENCE TO RELATED APPLICATIONS

This application is a U.S. National Stage Entry of International Patent Application Serial Number PCT/EP2020/078560, filed Oct. 12, 2020, which claims priority to German Patent Application No. DE 10 2019 215 731.9, filed Oct. 14, 2019, and Belgian Patent Application No. 2019/5691, filed Oct. 14, 2019, the entire contents of all of which are incorporated herein by reference.

FIELD

The present disclosure generally relates to coolers and methods for cooling bulk material such as cement clinker.

BACKGROUND

For the cooling of hot bulk material, such as cement clinker, for example, it is known that the bulk material is discharged onto an aeration floor of a cooler, which aeration floor can be flowed through by a cooling medium, such as cooling gas, for example. The hot bulk material is then moved for the purpose of cooling from one end of the cooler to the other end and in the process is flowed through by cooling gas. For the purpose of cooling a fine material, the use of a fluidized bed cooler is known, for example. A fine material cooler is known from EP 0 576 053 A1, for example. Such a fine material cooler is suitable exclusively for fine material. If coarse material also enters the fine material cooler in addition to the fine material, the cooling efficiency of the fine material cooler is significantly reduced, because the transporting away of the coarse material is made more difficult and the fine material cooler can become clogged by the coarse material. It is therefore frequently only possible to convey the coarse material to the material outlet of the fine material cooler manually. In particular in a separation cooler, in which fine material and coarse material are cooled separately from one another, it is therefore necessary to completely separate the fine material and the coarse material, such that the fine material cooler is filled exclusively with fine material. Such a complete separation is very complex.

Thus a need exists for a cooler and a method for cooling bulk material, in particular a fine material cooler for cooling fine material, which preferably is especially well-suited for use in a separation cooler.

DETAILED DESCRIPTION

Figure 1:
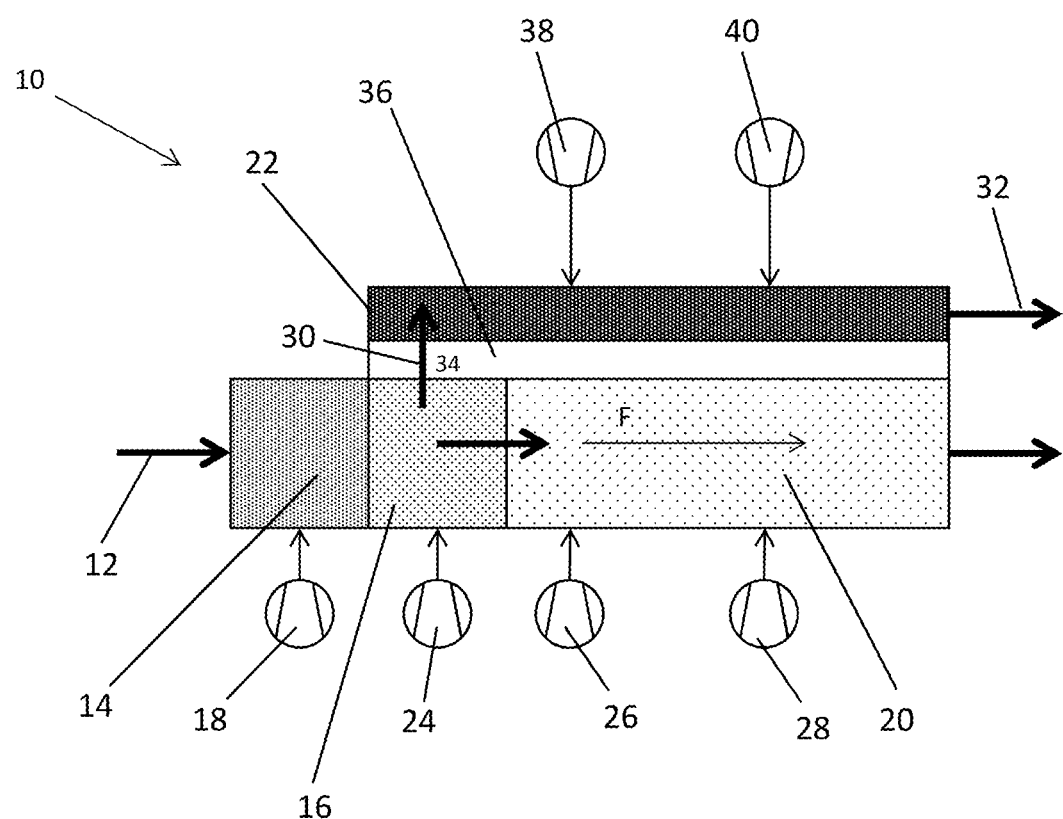
FIG. 1 is a schematic plan view of an example cooler for cooling bulk material.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a method for cooling bulk material, in particular cement clinker, in a fine material cooler comprises the following steps:
  admitting bulk material to be cooled into the fine material cooler through a material inlet, wherein the bulk material comprises a fine material proportion of 70% to 95%, in particular 75% to 85%, preferably 80%, and
  conveying the bulk material to be cooled in the conveying direction through the fine material cooler to a material outlet, wherein in the course of being conveyed in the conveying direction the bulk material is preferably cooled in crosscurrent.

The fine material cooler is arranged in a cooler for cooling bulk material, for example, wherein the cooler is a separation cooler, in which fine material and coarse material are cooled substantially separately from one another. The cooler preferably comprises a cooler inlet for admitting bulk material to be cooled into the cooler, a separation region, arranged downstream of the cooler inlet in the conveying direction of the bulk material, for separating coarse material and fine material, a coarse material cooler, connected to the separation region, for cooling the coarse material, and a fine material cooler, connected to the separation region and arranged parallel to the coarse material cooler, for cooling the fine material. In particular, a kiln for burning cement clinker is arranged upstream of the cooler, wherein the burnt cement clinker drops out of the kiln into the cooler through the material inlet. A method for cooling bulk material in such a cooler comprises the following steps: admitting bulk material to be cooled from a kiln into the cooler through a material inlet, separating fine material and coarse material in a separation region of the cooler, wherein the coarse material has a grain size larger than that of the fine material, cooling the fine material in a fine material cooler by means of a cooling medium and cooling the coarse material in a coarse material cooler separately to the fine material.

The cooler inlet region adjoins the material inlet, for example, and comprises a static grate, for example, which is arranged below the kiln outlet, with the result that gravity causes the bulk material leaving the kiln to drop onto the static grate. The static grate is for example a grate which is placed at an angle to the horizontal of 10° to 35°, preferably 12° to 33°, in particular 13° to 21° and through which cooling air flows from underneath.

The separation region, in which the fine material and the coarse material of the bulk material are separated and subsequently cooled separately from one another, is connected to the material inlet or the static grate of the cooler inlet region, for example directly, in the flow direction of the bulk material to be cooled. The separation region comprises a static or a dynamic grate, for example. In addition, the separation region comprises means for separating the fine material from the coarse material of the bulk material.

The fine material is for example bulk material having a grain size of for instance $10^{-5}$ mm to 4 mm, preferably $10^{-5}$ mm to 2 mm, the coarse material being bulk material having a grain size of 4 mm to 100 mm, preferably 2 mm to 100 mm. The split between the coarse material and the fine material is preferably at a grain size of 2 mm. The fine material preferably comprises a proportion of 90% to 95% of bulk material having the grain size of $10^{-5}$ mm to 4 mm, preferably $10^{-5}$ mm to 2 mm, it being possible for 5% to 10% of the fine material to be bulk material having a grain size of more than 2 mm, preferably more than 4 mm. The coarse material preferably comprises a proportion of 90% to 95% of bulk material having the grain size of 2 mm to 100 mm, preferably 4 mm to 100 mm, it being possible for 5% to 10% of the coarse material to be bulk material having a grain size of less than 2 mm, preferably less than 4 mm.

The fine material cooler and the coarse material cooler preferably adjoin the separation region, these coolers being arranged parallel to one another. The parallel arrangement of the fine material cooler and the coarse material cooler should not be understood as geometric, but rather in terms of the process technology. The fine material cooler may also be arranged parallel to the coarse material cooler in the geometric sense. The fine material cooler is preferably arranged parallel to the coarse material cooler in the conveying direction of the bulk material. The fine material cooler and the coarse material cooler preferably comprise a respective dynamic grate, through each of which a cooling medium for cooling the bulk material lying on the dynamic grate flows. The cooling medium is for example cooling air, which is blown through the fine and coarse material cooler by means of fans.

The admission of bulk material having a fine material proportion of 70% to 95%, in particular 75% to 85%, preferably 80%, makes it possible to efficiently operate a separation cooler, with the result that complete separation of the fine material and the coarse material is not necessary.

A separation means, for example, is arranged between the separation region and the fine material cooler, the separation means extending completely or partially along a longitudinal side of the separation region. The separation means is preferably in the form of a wall.

The separation means in particular comprises a fine material outlet for discharging the fine material from the separation region into the fine material cooler, the fine material outlet preferably being arranged completely above the aeration floor of the separation region. The fine material outlet of the separation region preferably constitutes the fine material inlet into the fine material cooler, the fine material cooler being connected to the separation region directly or by way of a transport means for transporting the fine material, for example. The coarse material is preferably present in the lower bulk material region of the separation region, the fine material resting on the coarse material in the upper region. The separation region therefore comprises an upper fine material region and a coarse material region, directly adjoining the latter below it, which is connected to the aeration floor of the separation region. A fine material outlet for discharging fine material from the separation region into the fine material cooler above the aeration floor of the separation region makes it possible preferably for fine material to enter the fine material cooler. The fine material outlet is preferably arranged in the fine material region of the separation region, in which fine material is exclusively or predominantly present. The coarse material region, in which coarse material is predominantly or exclusively present, is preferably arranged completely or partially below the fine material outlet, with the result that said coarse material cannot enter the fine material cooler through the fine material outlet under the effect of gravity. Preferably, such a configuration has the result that less than 10% to 30%, in particular 15% to 25%, preferably 20%, of the entering material having a particle size of greater than 4 mm, preferably of greater than 2 mm, enters the fine material cooler. For example, the separation means in the form of the wall forms a side wall of the separation region and for example at the same time a side wall of the coarse material cooler.

According to a first embodiment, the fine material of the bulk material is conveyed pneumatically. In particular, the fine material is fluidized by means of a cooling air flow, which is created for example by way of a plurality of fans, with the result that it behaves like a liquid mass. The fine material is transported in the conveying direction preferably by continuously introducing bulk material into the fine material cooler, with the result that the fluidized fine material is moved in the conveying direction.

According to a further embodiment, the bulk material comprises a coarse material proportion of 5% to 30%, in particular 25% to 15%, preferably 20%, the coarse material being conveyed pneumatically. The coarse material is preferably conveyed by means of compressed air, which is created by a compressed-air device, such as for example a compressor. In particular, the fine material and the coarse material are conveyed by different pneumatic conveying units, with the result that the conveying speeds of the fine material and of the coarse material are different, for example, and can be set separately from one another. During operation of the fine material cooler, the coarse material settles in the lower bulk material region, wherein the upper bulk material region is formed by fine material.

According to a further embodiment, the compressed air is conducted into the fine material cooler by way of compressed-air inlets pointing in the conveying direction, the coarse material being transported in the conveying direction by means of the compressed air.

The compressed-air inlets are in the form of channels in the aeration floor or lines, for example, and extend preferably exclusively in that region of the fine material cooler in which the coarse material is arranged.

According to a further embodiment, the bulk material comprises a coarse material proportion of 5% to 30%, in particular 25% to 15%, preferably 20%, the coarse material being conveyed mechanically. The fine material cooler is preferably operated in such a way that the bulk material in the fine material cooler has a height of 100 mm to 400 mm, in particular 200 mm to 300 mm, preferably 250 mm.

According to a further embodiment, the coarse material and the fine material are discharged from the fine material cooler separately. For example, the coarse material is discharged from the fine material cooler through a coarse material outlet and the fine material is discharged from the fine material cooler through a separate fine material outlet. The coarse material outlet is arranged for example upstream of the fine material outlet in the conveying direction of the bulk material. It is likewise conceivable to arrange the fine material outlet upstream of the coarse material outlet in the conveying direction. Discharging the fine material out of an opening in the aeration floor and/or an opening in the side wall of the fine material cooler is suitable for this, for example. For example, the fine material lying above the coarse material is withdrawn from the fine material cooler via an overflow. It is also conceivable for the coarse material and the fine material to be discharged from the fine material cooler together from a common material outlet.

According to a further embodiment, the bulk material in a region of the fine material cooler that is downstream in the conveying direction is conveyed exclusively mechanically. The fine material is preferably not pneumatically conveyed in a region of the fine material cooler that is downstream in the conveying direction. For example, the pneumatic conveyance of the fine material, in particular the fluidization of the fine material, is effected exclusively not in that region of the fine material cooler that is connected to the material outlet. In the downstream region of the fine material cooler, the fine material settles on the coarse material, which means that it is possible to separate the fine material by means of an overflow, for example. That region of the aeration floor that adjoins the fine material outlet preferably comprises a region without cooling-air passages.

The invention also comprises a cooler for cooling bulk material, in particular cement clinker, comprising a cooler inlet for admitting bulk material to be cooled into the cooler, a separation region, arranged downstream of the cooler inlet in the conveying direction of the bulk material, for separating coarse material and fine material, a coarse material cooler, connected to the separation region, for cooling the coarse material, and a fine material cooler, connected to the separation region and arranged parallel to the coarse material cooler, for cooling the fine material. The fine material cooler comprises a first conveying unit for conveying coarse material and a second conveying unit for conveying fine material. Conveying the fine material and the coarse material separately makes it possible to cool coarse material and fine material together in a cooler, with the result that it is not necessary to completely separate fine material and coarse material within the separation region. Furthermore, the active conveyance of the coarse material prevents the fine material cooler from becoming clogged.

The configurations and advantages explained with respect to the cooler for cooling bulk material also apply correspondingly in method terms to the method for cooling bulk material.

The fine material cooler comprises in particular an aeration floor, which is in the form of a grate, for example, and on which the bulk material rests. The first conveying unit for conveying the coarse material is preferably arranged in such a way that only the coarse material resting on the aeration floor can be conveyed by means of the first conveying unit. The first conveying unit is preferably arranged such that it conveys only the lower bulk material region in which the coarse material lies. The coarse material layer has for example a height of 20 mm to 200 mm, in particular 50 mm to 150 mm, preferably 100 mm.

According to a further embodiment, the first conveying unit for the coarse material is a mechanical or a pneumatic conveying unit. According to a further embodiment, the second conveying unit for the fine material is a pneumatic conveying unit. The mechanical conveying unit preferably comprises an aeration floor, for example a grate. According to a further embodiment, the mechanical conveying unit comprises a plurality of conveying elements, which can be moved simultaneously in the conveying direction and non-simultaneously counter to the conveying direction. The conveying elements are planks, for example, preferably grate planks, which, being arranged next to one another, form an aeration floor. The conveying elements can be moved in the conveying direction F and counter to the conveying direction F. The conveying elements in the form of conveying planks or grate planks preferably can be flowed through by cooling air, are arranged over the entire length of the fine material cooler, and form the surface on which the bulk material rests. It is likewise conceivable that the mechanical conveying unit comprises, for example, a stationary aeration floor, which can be flowed through by cooling air, and a plurality of conveying elements which can be moved relative to the aeration floor. The conveying elements are preferably arranged above the aeration floor and comprise entrainment elements running transversely to the conveying direction. To transport the bulk material along the aeration floor, the conveying elements can be moved in the conveying direction and counter to the conveying direction. The conveying elements can preferably be moved in accordance with the "walking floor principle", the conveying elements all being moved simultaneously in the conveying direction and non-simultaneously counter to the conveying direction. The conveying elements of the mechanical conveying unit preferably extend exclusively in that region of the bulk material in which the coarse material is present.

The mechanical conveying unit is for example a screw conveyor or other conveying units used in bulk material technology. The screw conveyor preferably extends in the conveying direction above the aeration floor.

According to a further embodiment, the pneumatic conveying unit for conveying the fine material comprises a plurality of fans for applying a cooling air flow to the fine material. The fans are preferably arranged below the aeration floor, with the result that the cooling air flow flows through the aeration floor into the bulk material lying thereon. In particular, the fans are formed and configured in such a way that they fluidize the fine material, with the result but it is preferably transported in the conveying direction through the bulk material that has been admitted into the fine material cooler. In addition, the first conveying unit of the fine material cooler is in the form of a mechanical conveying unit, for example.

According to a further embodiment, the pneumatic conveying unit for conveying the coarse material in the conveying direction comprises a compressed-air device for applying compressed air to the coarse material. The compressed-air device preferably comprises a compressor for creating the compressed air and a plurality of compressed-air inlets in the form of channels pointing in the conveying direction, for example. The compressed-air inlets preferably extend through the aeration floor or are arranged above the aeration floor. The channels pointing in the conveying direction ensure the reliable transport of the coarse material along the aeration floor in the conveying direction.

According to a further embodiment, a plurality of conducting elements for conducting the fine material within the fine material cooler are arranged in the fine material cooler. The conducting elements preferably extend into the bulk material region which predominantly comprises fine material. For example, the conducting elements are arranged spaced apart from the aeration floor, with the result that the coarse material is arranged below the conducting elements. For example, the conducting elements are spaced apart from the aeration floor by 20 mm to 200 mm, in particular 50 mm to 150 mm, preferably 100 mm. A plurality of parallel conducting elements are preferably arranged over the entire length of the fine material cooler in a manner uniformly spaced apart from one another. As an alternative, the conducting elements may also be partially mounted on the aeration floor and protrude into the bulk material, consisting of coarse material and fine material. This produces deflections when the bulk material is being conveyed through the fine material cooler, as a result of which the bulk material flow is locally mixed through. The conducting elements extend orthogonally to the conveying direction, for example.

According to a further embodiment, the fine material cooler comprises a coarse material outlet for discharging coarse material from the fine material cooler, and a fine material outlet for discharging fine material from the fine material cooler. The coarse material outlet and the fine material outlet are arranged separately from one another. The coarse material outlet is preferably arranged in the form of a depression in the aeration floor or downstream of the aeration floor in the conveying direction. In particular, the fine material outlet is arranged downstream of the coarse material outlet in the conveying direction.

FIG. 1 shows a cooler 10 for cooling hot bulk material, in particular cement clinker. The cooler 10 is preferably arranged downstream of a kiln, in particular a rotary tubular kiln, which is not illustrated in FIG. 1, for burning cement clinker, with the result that gravity causes hot bulk material leaving the kiln to drop onto the cooler 10, for example.

The cooler 10 comprises a plurality of regions, in each of which the bulk material has different temperatures and is cooled in a different way, for example. The cooler 10 comprises a material inlet 12 for admitting hot bulk material into the cooler 10. The material inlet 12 is for example the region between the kiln outlet and a static grate of the cooler 10, the bulk material preferably dropping through the material inlet 12 under the effect of gravity. The bulk material to be cooled has in the material inlet 12 a temperature of 1200 to 1450° C., for example. A cooler inlet region 14, which comprises a static grate, for example, is connected to the material inlet 12. The static grate is for example a grate which is placed at an angle to the horizontal of 10° to 35°, preferably 12° to 30°, in particular 13° to 21° and through which cooling air flows from underneath. The static grate is preferably arranged below the kiln outlet, with the result that the bulk material drops out of the kiln outlet directly onto the static grate and slides along it in the conveying direction.

In the cooler inlet region 14 of the cooler 10, the bulk material is cooled in particular to a temperature of less than 1150° C. The static grate preferably comprises passages, through which cooling air enters the cooler 10 and the bulk material. The cooling air is for example created by at least one fan 18 arranged below the static grate, with the result that cooling air flows through the static grate from underneath. Within the cooler 10, the bulk material to be cooled is moved in the conveying direction F. The separation region 16 is optionally connected to the cooler inlet region 14 or directly to the cooler inlet 12, the cooler inlet region 14 optionally not being present or for example coinciding with the separation region 16. The separation region 16 of the cooler 10 is optionally in particular arranged in such a way that the bulk material drops out of the kiln outlet directly onto the static grate or the dynamic grate of the separation region 16. In the exemplary embodiment of FIG. 1, a separation region 16 of the cooler 10 is connected to the cooler inlet region 14 in the flow direction of the bulk material.

In the separation region 16, the bulk material is separated into fine material and coarse material. In the separation region 16, the bulk material is preferably cooled to a temperature of less than 1150° C., preferably 1100° C., in particular 800° C., the cooling being effected in such a way that liquid clinker phases present in the bulk material are completely solidified to form solid phases. When it leaves the separation region 16 of the cooler 10, the bulk material is preferably present completely in the solid phase and at a temperature of at most 1100° C. When the bulk material is being separated into coarse material and fine material, at least the fine material is present preferably at least partially or completely in the solid phase and has a temperature of less than 1150° C., in particular less than 1100° C. At such a temperature, there is no fusing together or clumping of the bulk material. The fine material particles and the coarse material particles are present substantially separately from one another preferably in different layers, with the result that the fine material and the coarse material can be separated optimally without there being caking or clumping of the bulk material. By way of example, the separation region 16 of the cooler 10 comprises one or more fans 24, by means of which cooling air flows through the bulk material to be cooled. The bulk material in the separation region preferably comprises an upper region, in which fine material is predominantly or exclusively present, and a lower region, in which coarse material is predominantly present. Fine material is to be understood as meaning bulk material having a grain size of for instance $10^{-5}$ mm to 4 mm, preferably $10^{-5}$ mm to 2 mm, the coarse material being bulk material having a grain size of 4 mm to 100 mm, preferably 2 mm to 100 mm. The split between the coarse material and the fine material is preferably at a grain size of 2 mm.

A coarse material cooler 20 for cooling the coarse material separated from the fine material in the separation region 16 and a fine material cooler 22 for cooling the fine material separated from the coarse material in the separation region are connected to the separation region 16, the fine material cooler 22 and the coarse material cooler 20 being arranged parallel to one another. It is preferably the case that, from the separation region, predominantly or exclusively fine material is conducted into the fine material cooler 22, with predominantly or exclusively coarse material being conducted into the coarse material cooler 20.

The fine material cooler 22 and/or the coarse material cooler 20 comprises for example a dynamic grate, which comprises a mechanical conveying unit with a plurality of conveying elements, which can be moved in the conveying direction F and counter to the conveying direction F, for transporting the bulk material in the conveying direction. The conveying unit is for example a sliding-floor conveyor, which comprises a plurality of conveying elements for transporting the coarse material. In the case of a sliding-floor conveyor, the conveying elements are for example a plurality of planks, preferably grate planks, which form an aeration floor. The conveying elements are arranged next to one another and can be moved in the conveying direction F and counter to the conveying direction F. The conveying elements in the form of conveying planks or grate planks preferably can be flowed through by cooling air, are arranged over the entire length of the coarse material cooler 20, and form the surface on which the bulk material rests.

The mechanical conveying unit may also be a pusher conveyor, with the mechanical conveying unit comprising a stationary aeration floor, which can be flowed through by cooling air, and a plurality of conveying elements which can be moved relative to the aeration floor. The conveying elements of the pusher conveyor are preferably arranged above the aeration floor and have entrainment elements running transversely to the conveying direction. To transport the bulk material along the aeration floor, the conveying elements can be moved in the conveying direction F and counter to the conveying direction F. The conveying elements of the pusher conveyor and of the sliding-floor conveyor can be moved in accordance with the "walking floor principle", the conveying elements all being moved simultaneously in the conveying direction and non-simultaneously counter to the conveying direction. As an alternative to this, other conveying principles used in bulk material technology are also conceivable.

Downstream of the coarse material cooler 20, the cooled coarse material is discharged from the cooler 10 preferably having a temperature of 50° C. to 200° C., preferably less than 100° C. By way of example, underneath the aeration floor the coarse material cooler 20 comprises a plurality of fans 26, 28, by means of which cooling air flows through the aeration floor from underneath.

The separation region 16 comprises for example an above-described dynamic grate, which comprises a mechanical conveying unit with a plurality of conveying elements, which can be moved in the conveying direction and counter to the conveying direction F, for transporting the bulk material in the conveying direction. It is also conceivable that the dynamic grate of the separation region 16 also forms the dynamic grate of the coarse material cooler 20 and extends over the entire length of the separation region 16 and of the coarse material cooler 20.

The fine material cooler 22 comprises a material inlet 30 for admitting fine material from the separation region 16 of the cooler 10 into the fine material cooler 22. The fine material cooler 22 also comprises a material outlet 32 in a region, which is for example situated opposite the material inlet 30, of the fine material cooler 22 for discharging fine material from the fine material cooler 22.

The separation region 16 comprises a fine material outlet 34 for discharging the fine material from the separation region 16 into the fine material cooler 22. The fine material outlet 34 and the material inlet 30 coincide, for example. The separation region 16 and the fine material cooler 22 are connected to one another for example by way of material chutes. The fine material cooler 22 comprises for example an above-described dynamic grate, which comprises a conveying unit with a plurality of conveying elements, which can be moved in the conveying direction and counter to the conveying direction F, for transporting the bulk material in the conveying direction.

The cooler 10 comprises for example a separation means 36, which is arranged in the separation region 16 of the cooler 10 and separates the fine material cooler 22 from the separation region 16 and the coarse material cooler 20. By way of example, the separation means 36 is a wall which extends completely at least along a longitudinal side of the separation region 16 in the conveying direction F of the bulk material. By way of example, the separation means 36 additionally extends completely or at least partially in the conveying direction F along a longitudinal side of the coarse material cooler 20.

In the separation region 16, the bulk material is preferably already present in two phases, the fine material being arranged above the coarse material. The coarse material preferably rests on the dynamic grate of the separation region 16, the fine material resting on the coarse material. The separation means 36 is plate-shaped, for example, and extends vertically from the dynamic grate of the separation region 16. The top edge of the separation means 36, in the form of a wall, serves as an outlet for discharging the fine material of the separation region 16 into the fine material cooler 22. The fine material forming the upper region of the bulk material bed flows over the separation means 36, in the form of a wall, into the fine material cooler 22. The fine material outlet 34 is attached completely above the dynamic grate. It is optimally the case that predominantly fine material enters the fine material cooler, a lower proportion of coarse material in the fine material cooler likewise being desired. The separation means 36 preferably has a height which is smaller than the height of the bulk material bed of the separation region 16. The fine material outlet 34 is formed by the top edge of the separation means 36, in the form of a wall, and is arranged in particular at a height below the height of the bulk material bed in the separation region 16 and does not extend beyond the height of the bulk material bed, in particular at any point of the separation region 16. The wall preferably extends beyond the height of the coarse material proportion of the bulk material bed, the fine material outlet 34 being arranged above the height of the coarse material proportion of the bulk material bed.

The separation means 36, preferably the wall, extends by way of example along the entire length of the fine material cooler 22 in the conveying direction F on the fine material cooler 22. The separation means 36 preferably extends over the entire longitudinal side of the fine material cooler 22 and separates the fine material cooler 22 from the separation region 16 and the coarse material cooler 20. The fine material outlet 34 extends for example exclusively in the separation region 16, preferably along the length of the separation region 16. By way of example, the fine material cooler 22 is arranged parallel to the coarse material cooler 20 and extends by way of example over the entire length of the coarse material cooler 20 parallel to the latter. The fine material cooler 22, the separation region 16 and the coarse material cooler 20 comprise a respective dynamic grate with a conveying device, for example. What is provided, for example, is a conveying device of a dynamic grate, which conveying device operates in accordance with the "walking floor principle" and comprises the fine material cooler 22, the separation region 16 and the coarse material cooler 20, with the fine material cooler 22 being separated from the separation region 16 and the coarse material cooler 20 by the separation means 36, in particular the wall.

Figure 2:
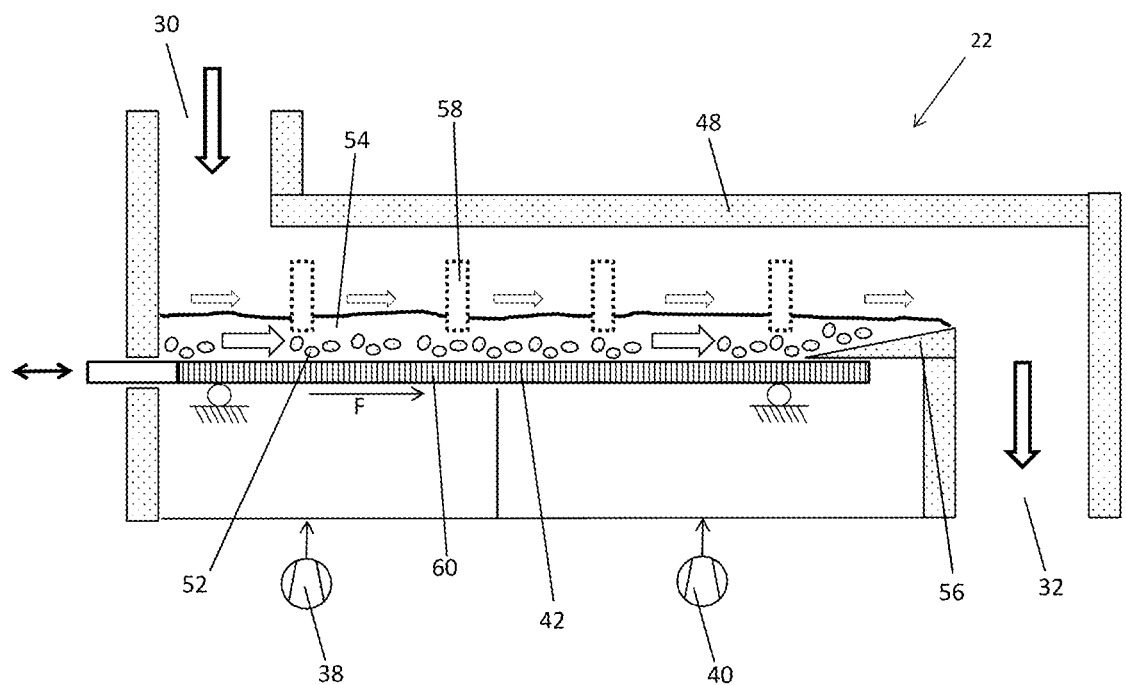
FIG. 2 is a sectional schematic view of an example cooler for cooling bulk material.

FIG. 2 shows an exemplary embodiment of a fine material cooler 22 with a mechanical conveying unit 42. A conveying plank, which can be moved in the conveying direction F and counter to the conveying direction F, is illustrated in FIG. 2 by way of example. The mechanical conveying unit 42 comprises cooling-air inlets 60, through which cooling air enters the bulk material resting on the mechanical conveying unit 42 from underneath. The bulk material in the fine material cooler 22 comprises coarse material 52, which settles on the mechanical conveying unit 42, in particular on the conveying planks, and forms the lower bulk material region. The bulk material in the fine material cooler 22 comprises fine material 54, which settles on the coarse material 52 and forms the upper bulk material region. The fine material 54 is lifted up, preferably fluidized, by the cooling air flowing into the fine material cooler 22 and is moved in the conveying direction. The fine material 54 behaves like a liquid mass, for example, and flows in the conveying direction F above the coarse material 52.

The fine material cooler 22 optionally comprises the conducting elements 58, illustrated by interrupted lines, for conducting the fine material 54 within the fine material cooler 22. The conducting elements 58 are for example plates of metal or of a heat-resistant material. By way of example, the conducting elements 58 are arranged uniformly spaced apart from one another in the conveying direction F and preferably extend respectively at least over part or the entire width of the interior of the fine material cooler. The conducting elements 58 are arranged parallel to one another, for example. The conducting elements preferably extend into the bulk material, in particular into the upper bulk material region, which consists predominantly of fine material 58. The conducting elements 54 preferably are not connected to the mechanical conveying unit 42 and are attached spaced apart from the latter. The spacing between the conducting elements 58 and the mechanical conveying unit 42 corresponds approximately to the height of the coarse material layer within the bulk material, with the result that the conducting elements 58 do not influence the flow of the coarse material 52 in the conveying direction F. As an alternative, the conducting elements 58 may also partially stand on the conveying unit 42 and extend vertically. This partially deflects, and in the process locally mixes through, the material flow in the fine material cooler 22.

A slanted floor 56, which by way of example has a wedge shape and leads into the material outlet 32, is arranged at the material-outlet-side end of the fine material cooler 22. The floor 56 may also be flat, or as an alternative also rise obliquely. The coarse material 52 and the fine material 54 are preferably discharged together from the fine material cooler 22 through the material outlet 32. The fine material cooler 22 furthermore comprises a housing 48, which extends by way of example additionally over the entire cooler 10, not illustrated in FIG. 2, having the coarse material cooler 20, the separation region 16 and the cooler inlet 14.

Figure 3:
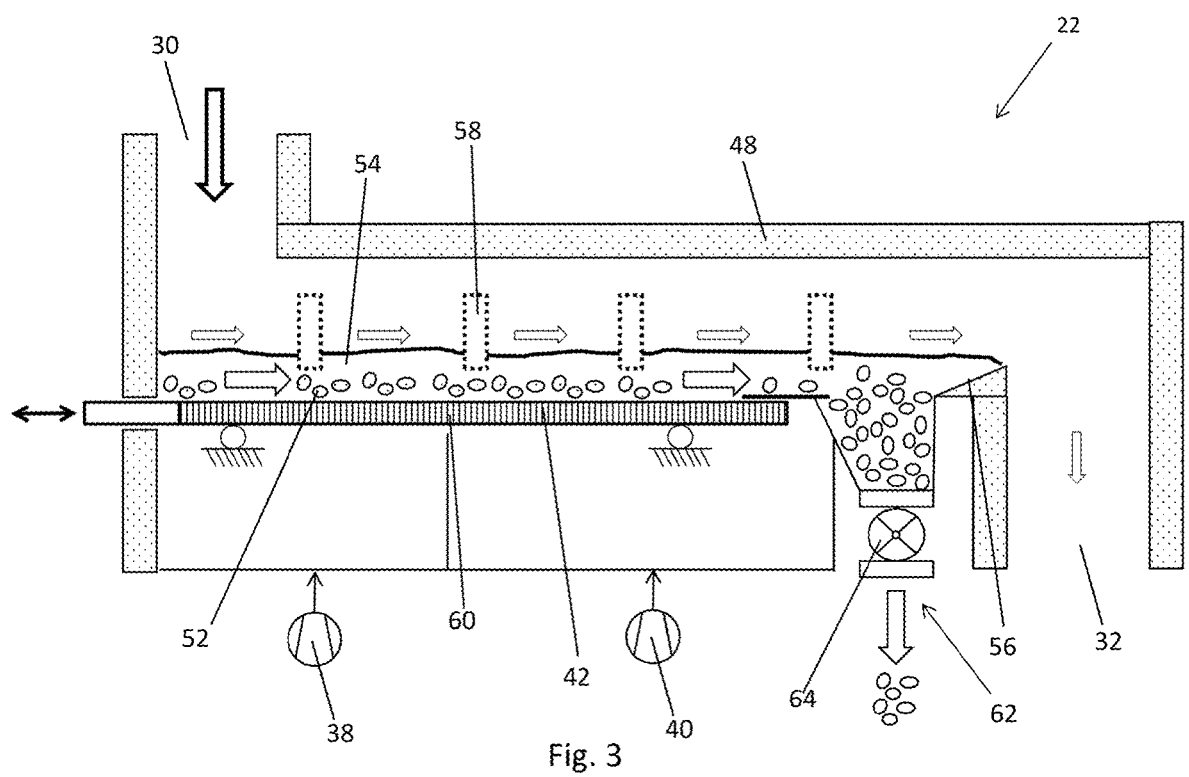
FIG. 3 is a sectional schematic view of another example cooler for cooling bulk material.

FIG. 3 shows a further exemplary embodiment of a fine material cooler 22, the same elements being provided with the same reference signs. By contrast to FIG. 2, the fine material cooler 22 of FIG. 3 comprises a coarse material outlet 62 for discharging the coarse material 52 from the fine material cooler 22. By way of example, the coarse material outlet 62 is in the form of a depression, with the result that the heavier coarse material settles therein during operation of the fine material cooler 22. By way of example, the coarse material outlet 62 is arranged upstream of the material outlet 32 in the conveying direction F. A material lock, such as a rotary feeder 64, for example, for metering the coarse material 52 leaving the fine material cooler 22 is connected to the coarse material outlet, for example. In the exemplary embodiment of FIG. 3, the material outlet 32 forms a fine material outlet for discharging the fine material 54 from the fine material cooler 22. The floor 56 on the fine material outlet may have a flat or rising design.

Figure 4:
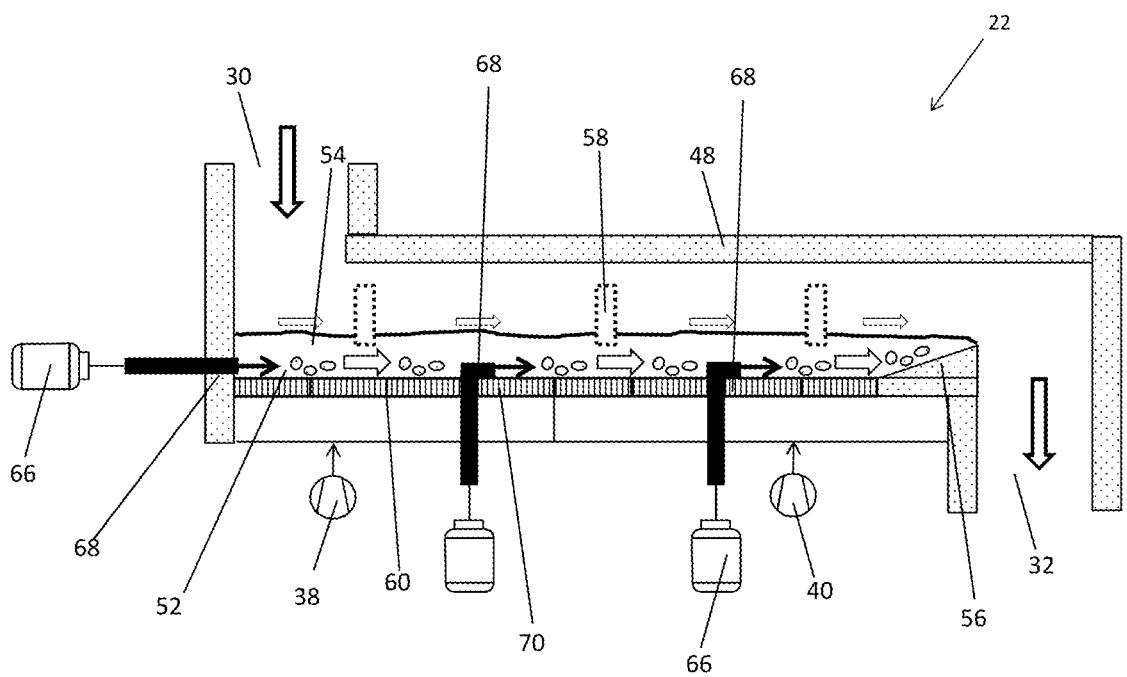
FIG. 4 is a sectional schematic view of still another example cooler for cooling bulk material.

FIG. 4 shows a further exemplary embodiment of a fine material cooler 22, the same elements being provided with the same reference signs. By way of example, the fine material cooler 22 illustrated in FIG. 4 does not comprise a mechanical conveying unit 42, but rather a pneumatic conveying unit 70 for conveying the coarse material 52. The pneumatic conveying unit 70 comprises a plurality of compressed-air devices 66 and a plurality of compressed-air inlets 68. The fine material cooler 22 preferably comprises an aeration floor, in particular a grate, on which the bulk material rests. The compressed-air device 66 is for example a compressor for creating compressed air, each compressed-air device 66 being connected to at least one compressed-air inlet 68, with the result that compressed air can be conducted into the bulk material by means of the compressed-air devices 66. The compressed-air inlets 68 are preferably formed in an aeration floor, on which the bulk material within the fine material cooler 22 rests. By way of example, a compressed-air inlet 68 is formed in the housing 48. The compressed-air inlets 68 are preferably in the form of channels for conducting the compressed air and point in particular in the conveying direction F, with the result that the compressed air is applied to the bulk material with a force acting in the conveying direction F. In particular, the compressed-air inlets 68 are arranged in that region of the fine material cooler 22 in which predominantly or exclusively coarse material is present during operation of the fine material cooler 22. The compressed-air devices 66 serve to transport the coarse material 52 that settles in the lower bulk material region, preferably on the aeration floor.

LIST OF REFERENCE SIGNS

10 Cooler
12 Material inlet
14 Cooler inlet region
16 Separation region
18 Fan
20 Coarse material cooler
22 Fine material cooler
24 Fan
26 Fan
28 Fan
30 Material inlet
32 Material outlet
34 Fine material outlet
36 Separation means
38 Fan
40 Fan
42 Mechanical conveying unit
48 Housing
52 Coarse material
54 Fine material
56 Fine material cooler outlet
58 Conducting elements
60 Cooling-air inlets
62 Coarse material outlet
64 Rotary feeder
66 Compressed-air device

What is claimed is:

1. A method for cooling bulk material in a fine material cooler, the method comprising:
admitting bulk material to be cooled into the fine material cooler through a material inlet, wherein the bulk material has a fine material proportion of 70% to 95% and a coarse material proportion of 5% to 30%, wherein the fine material has a grain size of $10^{-5}$ mm to 4 mm and the coarse material has a grain size of 4 mm to 100 mm;
conveying the coarse material with a first mechanical or pneumatic conveying unit; and
conveying the fine material independently of the course material with a second conveying unit in a conveying direction through the fine material cooler to a material outlet.

2. The method of claim 1 wherein the fine material of the bulk material is conveyed pneumatically.

3. The method of claim 1 comprising:
conducting compressed air into the fine material cooler via compressed-air inlets that point in the conveying direction; and
transporting the coarse material in the conveying direction via the compressed air.

4. The method of claim 1 comprising discharging the coarse material and the fine material from the fine material cooler separately.

5. The method of claim 1 comprising conveying exclusively mechanically the bulk material in a region of the fine material cooler that is downstream in the conveying direction.

6. A fine material cooler for cooling bulk material with a fine material proportion of 70% to 95% and a coarse material proportion of 5% to 30%, wherein the fine material has a grain size of $10^{-5}$ mm to 4 mm, the fine material cooler comprising:
- a material inlet configured to admit the bulk material to be cooled;
- a material outlet configured to discharge the bulk material;
- a first mechanical or pneumatic conveying unit configured to convey the coarse material; and
- a second conveying unit configured to convey the fine material independently of the course material, wherein the first and second conveying units are configured to convey the bulk material in the conveying direction through the fine material cooler to the material outlet.

7. The fine material cooler of claim 6 wherein the first conveying unit is a mechanical conveying unit, wherein the first conveying unit comprises conveying elements that are movable simultaneously in the conveying direction and non-simultaneously counter to the conveying direction.

8. The fine material cooler of claim 6 wherein the second conveying unit is a pneumatic conveying unit.

9. The fine material cooler of claim 8 wherein the second conveying unit comprises fans that are configured to apply a cooling air flow to the fine material.

10. The fine material cooler of claim 6 wherein the first conveying unit is a pneumatic conveying unit that comprises a compressed-air device configured to apply compressed air to the coarse material.

11. The fine material cooler of claim 6 comprising conducting elements disposed in the fine material cooler that are configured to conduct the fine material within the fine material cooler.

12. The fine material cooler of claim 6 comprising:
- a coarse material outlet configured to discharge the coarse material from the fine material cooler; and
- a fine material outlet configured to discharge the fine material from the fine material cooler.

13. A cooler for cooling bulk material, comprising:
- a cooler inlet configured to admit bulk material to be cooled;
- a separation region arranged downstream of the cooler inlet in a conveying direction of the bulk material, the separation region configured to separate coarse material and fine material, wherein the coarse material has a grain size of 4 mm to 100 mm, wherein the fine material has a grain size of $10^{-5}$ mm to 4 mm;
- a coarse material cooler following the separation region, the coarse material cooler configured to cool the coarse material; and
- a fine material cooler following the separation region and arranged parallel to the coarse material cooler, the fine material cooler configured to cool the fine material, wherein the fine material cooler comprises: a material inlet configured to admit the bulk material to be cooled; a material outlet configured to discharge the bulk material; a first mechanical or pneumatic conveying unit configured to convey the coarse material; and a second conveying unit configured to convey the fine material independently of the course material, wherein the first and second conveying units are configured to convey the bulk material in the conveying direction through the fine material cooler to the material outlet.

* * * * *